United States Patent
Iwata

(10) Patent No.: US 10,845,516 B2
(45) Date of Patent: Nov. 24, 2020

(54) DIFFRACTIVE OPTICAL ELEMENT

(71) Applicant: CANON KABUSHIKI KAISHA, Tokyo (JP)

(72) Inventor: Kenichi Iwata, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/895,917

(22) Filed: Feb. 13, 2018

(65) Prior Publication Data

US 2018/0239069 A1 Aug. 23, 2018

(30) Foreign Application Priority Data

Feb. 20, 2017 (JP) .................... 2017-028820
Jan. 25, 2018 (JP) .................... 2018-010318

(51) Int. Cl.
G02B 5/18 (2006.01)
G02B 27/00 (2006.01)
G02B 3/08 (2006.01)
B29D 11/00 (2006.01)

(52) U.S. Cl.
CPC ............ *G02B 5/1814* (2013.01); *G02B 3/08* (2013.01); *G02B 5/1847* (2013.01); *G02B 27/0037* (2013.01); *B29D 11/00269* (2013.01)

(58) Field of Classification Search
CPC ............. G02B 27/0037; G02B 5/1814; G02B 5/1847; G02B 3/08; G02B 27/00; G02B 5/18; B29D 11/00269
See application file for complete search history.

(56) References Cited

U.S. PATENT DOCUMENTS

| | | | | |
|---|---|---|---|---|
| 6,641,985 B2 * | 11/2003 | Unno | ............ | G02B 1/10 430/321 |
| 7,042,642 B2 * | 5/2006 | Tokoyoda | ............ | G02B 5/1814 359/566 |
| 8,605,358 B2 * | 12/2013 | Ushigome | ............ | G02B 27/4272 359/576 |
| 9,116,338 B2 * | 8/2015 | Yano | ............ | G02B 27/144 |
| 2002/0044345 A1 * | 4/2002 | Takeuchi | ............ | G02B 5/1876 359/361 |
| 2002/0051293 A1 * | 5/2002 | Nakai | ............ | G11B 7/1367 359/558 |
| 2003/0218803 A1 * | 11/2003 | Nakabayashi | ...... | B29C 35/0888 359/566 |
| 2004/0095656 A1 * | 5/2004 | Lee | ............ | G02B 3/08 359/742 |

(Continued)

FOREIGN PATENT DOCUMENTS

WO 2011099550 A1 8/2011

*Primary Examiner* — Balram T Parbadia
(74) *Attorney, Agent, or Firm* — Canon U.S.A., Inc. IP Division

(57) ABSTRACT

A diffractive optical element is provided that includes a first resin layer having steps on one surface, a second resin layer integrated with the first resin layer in tight contact, and a high refractive index layer disposed between a wall surface of the first resin layer and a wall surface of the second resin layer, wherein the high refractive index layer has a refractive index higher than those of the first resin layer and of the second resin layer, and the high refractive index layer is formed continuously to extend beyond the boundary between the wall surface and the inclined surface adjacent thereto, and to partly overlap the inclined surface.

14 Claims, 6 Drawing Sheets

(56) References Cited

U.S. PATENT DOCUMENTS

| | | | | |
|---|---|---|---|---|
| 2004/0125452 A1* | 7/2004 | Cho | ............... | G02B 5/1814 |
| | | | | 359/565 |
| 2011/0044150 A1* | 2/2011 | Tojo | ............... | G02B 27/0037 |
| | | | | 369/100 |
| 2011/0147872 A1* | 6/2011 | Inoue | ............... | G02B 5/1876 |
| | | | | 257/432 |
| 2011/0235180 A1* | 9/2011 | Minami | ............... | G02B 5/0294 |
| | | | | 359/571 |
| 2011/0304916 A1* | 12/2011 | Ushigome | ............... | G02B 5/1814 |
| | | | | 359/576 |
| 2011/0304917 A1* | 12/2011 | Ushigome | ............... | G02B 5/1895 |
| | | | | 359/576 |
| 2012/0087008 A1* | 4/2012 | Ushigome | ............... | G02B 5/1895 |
| | | | | 359/576 |
| 2014/0363651 A1* | 12/2014 | Lu | ............... | C08L 29/04 |
| | | | | 428/217 |

\* cited by examiner

DIFFRACTIVE OPTICAL ELEMENT

BACKGROUND

Field of the Disclosure

The present disclosure relates to a diffractive optical element for use in an optical apparatus, such as a still camera, a video camera, a microscope, and an endoscope.

Description of the Related Art

A relief diffraction grating, which is a type of diffractive optical element, has a structure having a plurality of concentric steps (relief pattern). Such structure includes a plurality of wall surfaces that form these steps, and a plurality of inclined surfaces each bounded by the wall surfaces. The inclined surfaces are each an optically effective surface functioning as an optical element to focus incident light on a desired location. In contrast, the wall surfaces do not function as an optical element. Light incident upon a wall surface is reflected and refracted by the wall surface to a location different from the desired focus location, causing a phenomenon called flare on the image. Flare significantly reduces the image quality. Accordingly, various methods have heretofore been suggested for reducing or eliminating such flare.

For example, International Publication No. 2011/99550 discloses a configuration for providing an improved diffraction efficiency by forming, on the wall surfaces, a waveguide layer formed of a material having a refractive index higher than the refractive index of the resin layer that forms the grating. Light incident upon a diffractive optical element having such configuration enters the waveguide without reflection or refraction on the wall surface, is then totally reflected within the waveguide repeatedly to propagate in a direction parallel to the wall surface, and is output from an end of the waveguide. Thus, flare can be reduced in principle.

International Publication No. 2011/99550 discloses a configuration capable of reducing flare. However, application of this configuration to a gapless dual-layered diffraction grating presents the following disadvantages caused by using a waveguide layer.

A gapless dual-layered diffraction grating is configured such that a first grating layer and a second grating layer are integrated with no gap therebetween, and having, therebetween, a grating interface on which a relief pattern is formed. As such, if the waveguide layer described above is formed on the wall surface having such relief pattern, three different materials, i.e., the first grating layer, the waveguide layer, and the second grating layer, are in contact with each other on the wall surface. A transmission diffraction grating includes a first grating layer and a second grating layer formed of glass or optical resin. In many cases, at least one of the grating layers is formed of optical resin. The waveguide layer is formed of an inorganic material because of a need for a refractive index higher than the refractive indices of the first grating layer and of the second grating layer, and a need for a low and constant film thickness.

Thus, the use of the waveguide layer according to International Publication No. 2011/99550 in a gapless dual-layered diffraction grating results in coexistence of an organic material and an inorganic material on the wall surface. The point here is that the linear expansion coefficient is significantly different between an organic material and an inorganic material. For example, an acrylic resin commonly used as an optical material has a linear expansion coefficient of $5\times10^{-5}/°$ C., while alumina, which is an inorganic material, has a linear expansion coefficient of $7\times10^{-6}/°$ C., which is lower by a factor of almost 10.

A gapless dual-layered diffraction grating may generally be manufactured in a process as follows: a first grating layer is formed using a replica technique or other method, a waveguide layer is then formed on the wall surface, and finally, a second grating layer is formed in tight contact with the first grating layer. The second grating layer is formed by curing a resin keeping in tight contact with the first grating layer. Note that a typical resin is subject to change in the volume by about 5% to 10% between before and after the curing. Therefore, although specific details may vary depending on the viscoelasticity properties of both materials, the curing process of the resin of the second grating layer may affect the first grating layer that has already been formed. This means that the formation of the second grating layer may cause deformation of the first grating layer. In this case, due to the shape of the wall surface that may easily induce a stress, the wall surface may undergo large deformation sufficiently to cause separation at the interface between the grating layer and the waveguide layer, and thus to generate an air layer between the grating layer and the waveguide layer. An air layer at the interface between the grating layer and the waveguide layer changes the refractive index at the interface between the grating layer and the waveguide layer from the design value. Thus, the light incident upon the waveguide layer is not totally reflected in the waveguide layer, and may leak into the grating layer before reaching the end portion of the waveguide layer, thereby preventing the light from being output through the end portion of the waveguide layer as designed. Accordingly, the flare reduction effect may not be provided.

In addition, separation at the interface between the grating layer and the waveguide layer may also be triggered by environmental factors such as a high temperature, a low temperature and a high temperature/high humidity. Thus, even if the optical performance is sufficiently high some time after production, the optical performance may degrade over time.

SUMMARY OF THE DISCLOSURE

It is one aspect of the present disclosure to provide a gapless dual-layered diffractive optical element including a waveguide layer on a wall surface, and capable of reducing or eliminating separation at the interface between the waveguide layer and the grating layer to reduce occurrence of flare for a prolonged period of time after production.

In a first aspect of the present disclosure, a diffractive optical element is provided that includes a first resin layer having a first surface, the first surface having a plurality of steps, wherein the plurality of steps include a plurality of wall surfaces and a plurality of inclined surfaces each bounded by the wall surfaces, a second resin layer disposed on a side closer to the first surface of the first resin layer, wherein a surface, of the second resin layer, on a side closer to the first resin layer has a plurality of steps respectively corresponding to the steps of the first resin layer, and a high refractive index layer disposed between the wall surfaces of the first resin layer and a corresponding one of the wall surfaces of the second resin layer, wherein the high refractive index layer has a refractive index higher than refractive indices of the first resin layer and of the second resin layer, wherein the high refractive index layer is formed to extend beyond the wall surfaces, and to overlap portions of adjacent ones of the inclined surfaces.

In a second aspect of the present disclosure, an optical apparatus is provided that includes the diffractive optical element according to the first aspect of the present disclosure.

Further features of the present disclosure will become apparent from the following description of exemplary embodiments (with reference to the attached drawings).

BRIEF DESCRIPTION OF THE DRAWINGS

FIG. 1A is a cross-sectional view along the thickness direction illustrating the overall configuration of the diffractive optical element. FIG. 1B is a partial enlarged cross-sectional view along the thickness direction of the diffractive optical element of FIG. 1A. FIG. 1C is a top view of the diffractive optical element of FIG. 1A, viewed from the light incident side.

DESCRIPTION OF THE EMBODIMENTS

Figure 1A:
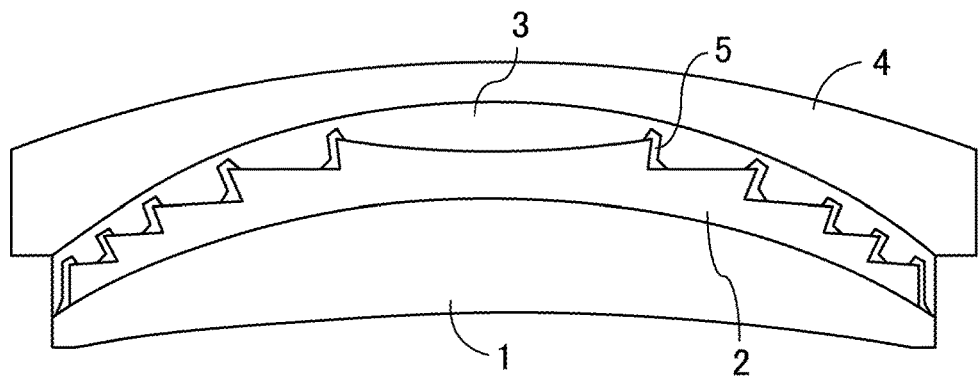
FIGS. 1A to 1C are views schematically illustrating the configuration of a diffractive optical element according to one embodiment of the present disclosure.

An exemplary embodiment of the present disclosure will be described in detail below with reference to drawings. It is understood that the present disclosure is not limited to the specific embodiment disclosed. Note that elements or features other than those specifically described in the description below or other than those specifically illustrated in the drawings may be implemented using any known technique in the art.

Figure 1B:
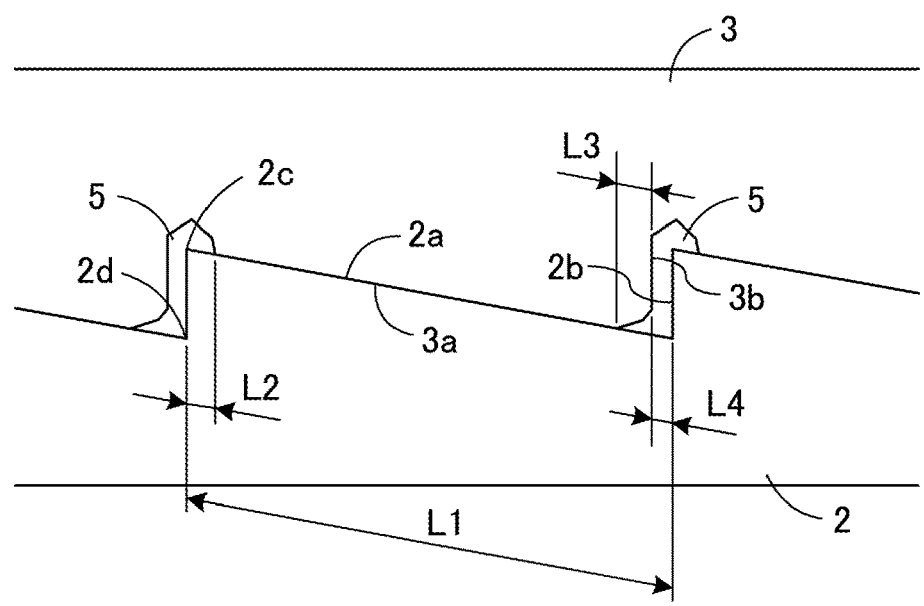
Figure 1C:
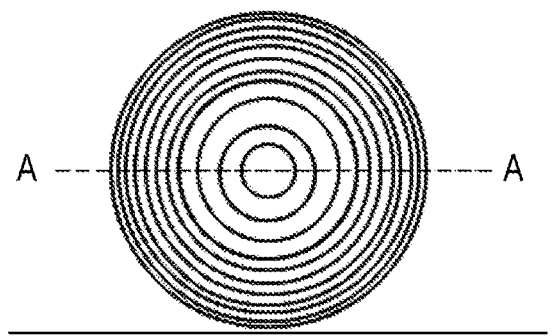

FIGS. 1A to 1C schematically illustrate the configuration of a diffractive optical element according to one embodiment of present disclosure. FIG. 1A is a cross-sectional view along the thickness direction illustrating the overall configuration of the diffractive optical element. FIG. 1B is a partial enlarged cross-sectional view of the diffractive optical element of FIG. 1A. FIG. 1C is a top view of the diffractive optical element of FIG. 1A, viewed from the light incident side. FIGS. 1A and 1B each illustrate a cross section of the diffractive optical element, taken along line A-A of FIG. 1C. Line A-A passes through the optical axis, which is at the center of the diffractive optical element. In other words, a cross section along the thickness direction refers to a cross section of the diffractive optical element, taken along a line passing through the center viewed from above the diffractive optical element. As illustrated in FIG. 1A, the diffractive optical element according to the embodiment of the present disclosure is a gapless dual-layered diffractive optical element including a first resin layer 2 and a second resin layer 3. The first resin layer (blazed diffraction grating) 2 has, on one surface (first surface) of the first resin layer 2, a plurality of steps having a saw-toothed cross-section along the thickness direction, and each having a concentric shape viewed from the light incident side. The first surface of the first resin layer 2 includes a plurality of wall surfaces 2b that form the steps described above, and a plurality of inclined surfaces 2a each bounded by the wall surfaces 2b. In other words, the wall surfaces 2b and the inclined surfaces 2a together form a relief pattern. The second resin layer 3 has, on the surface closer to the first resin layer 2, a plurality of steps respectively corresponding to the steps of the first resin layer 2 so that the second resin layer 3 will be disposed in tight contact with the first resin layer 2. The surface closer to the first resin layer 2 of the second resin layer 3 includes a plurality of wall surfaces 3b that form the steps of the second resin layer 3, and a plurality of inclined surfaces 3a each bounded by the wall surfaces 3b. A high refractive index layer 5 is disposed between the wall surfaces 2b of the first resin layer 2 and a corresponding one of the wall surfaces 3b of the second resin layer 3. Note that, to simplify the description, the term "wall surface" may be used herein in the singular form especially in a context of a high refractive index layer; however, such description also applies to other wall surfaces of the diffractive optical element.

This embodiment assumes that the high refractive index layer 5 is formed on the first resin layer 2, and a resin is then filled and cured so as to be held in tight contact with the first resin layer 2 and with the high refractive index layer 5 to form the second resin layer 3. Note that the terms "first" and "second" as used herein do not denote any order, quantity, or importance, but rather are used to distinguish one element from another.

The diffractive optical element of FIG. 1A includes a first base material 1 on a side opposite the first surface across the first resin layer 2, and a second base material 4 on a side opposite the first resin layer 2 across the second resin layer 3. These base materials 1 and 4 may each be formed of either a glass material or an optical resin material that provides desired optical characteristics, including transparency. However, a glass material is more suitable in view of low probability of variation in characteristics (i.e., high reliability). Examples of such glass material include "S-LAH55" (manufactured by Ohara. Inc.), which is a lanthanum-based, high refractive index, low dispersion glass, and "S-FPL51" (manufactured by Ohara Inc.), which is an ultra-low dispersion glass. Note that the second base material 4 may be or not be included because presence and absence of the second base material 4 differ only slightly in optical performance provided in terms of a diffraction grating.

The first resin layer 2 and the second resin layer 3 are each a diffraction grating. The resin materials for forming the first and the second resin layers 2 and 3 are not particularly limited as long as such materials are optical resin materials capable of providing satisfactory optical characteristics and reliability. However, from a viewpoint of producibility, a photosensitive resin material is preferred. Examples of suitable resin material include an acrylate-based resin and a polycarbonate resin. To achieve optical performance required, inorganic fine particles may be added to the optical resin material depending on the situation. The inorganic fine particles to be added are selected based on the optical characteristics required. Examples of the material of such inorganic fine particles include zirconia oxide, titanium oxide, zinc oxide, indium oxide, tin oxide, antimony oxide, indium tin oxide (ITO), antimony-doped tin oxide (ATO), and zinc-doped indium oxide (IZO).

FIG. 1B is a partial enlarged view of FIG. 1A. As illustrated in FIG. 1B, in the embodiment of the present disclosure, the high refractive index layer 5 disposed between the wall surface 2b of the first resin layer 2 and the waif surface 3b of the second resin layer 3 is formed to partly overlap the inclined surfaces 2a and 3a. More specifically, paying attention to the first resin layer 2, the high refractive index layer 5 formed on the wall surface 2b is formed continuously to extend beyond the boundary between the wall surface 2b and the inclined surface 2a, and to partly overlap the inclined surface 2a. In the embodiment of the present disclosure, forming of the high refractive index layer 5 not only on the wall surface 2b but also on the inclined surface 2a prevents separation at the interfaces between the high refractive index layer 5 and the first resin layer 2 and between the high refractive index layer 5 and the second resin layer 3.

However, the extension of the high refractive index layer 5 to partly overlap the inclined surface 2a reduces the effective area of the inclined surface 2a, and accordingly degrades optical characteristics as compared to those required of the diffractive optical element. Thus, it is preferable that the proportion of the area of the high refractive index layer 5 overlapping the inclined surface 2a to the area of the inclined surface 2a be determined so that the initial optical characteristics will not be significantly degraded while optical characteristic degradation due to the separation can be reduced or eliminated. Further details will be described below.

The top of the wall surface 2b as illustrated in FIG. 1B is herein referred to as "grating ridge 2c" of the first resin layer 2, and the bottom of the wall surface 2b as illustrated in FIG. 1B is herein referred to as "grating trough 2d" of the first resin layer 2. The grating ridge 2c and the grating trough 2d are each a boundary between the inclined surface 2a and the wall surface 2b. The length L2 represents the length of the portion of the high refractive index layer 5 overlapping the inclined surface 2a adjacent to the grating ridge 2c in the cross-section along the thickness direction of the diffractive optical element. The length L3 represents the length of the portion of the high refractive index layer 5 overlapping the inclined surface 2a adjacent to the grating trough 2d minus the thickness L4. Although the description below will specifically outline the length of the portion of the high refractive index layer 5 overlapping the inclined surface 2a of the first resin layer 2, a similar explanation also applies to the second resin layer 3.

As described above, the lengths L2 and L3 of the portions of the high refractive index layer 5 overlapping the inclined surface 2a are adjusted to a value that can achieve both optical performance required of a diffractive optical element, and a reduction of separation. The most important characteristic in the optical performance required a diffractive optical element is diffraction efficiency. A diffraction efficiency is the ratio of the intensity of diffracted light of the designed diffraction order output to a desired location to the intensity of the incident light. The diffractive optical element according to the embodiment is designed so that the light incident upon the inclined surface 2a will entirely act as effective light. Although specific details may vary depend on the specific design, it is generally assumed that only two materials forming the grating interface exist on the inclined surface 2a. A foreign material may reduce the diffraction efficiency. A material having a refractive index higher than the refractive index of the material that constitutes the grating interface present on the inclined surface 2a causes, as a refractive optical system, the light to propagate at a refraction angle different from the design angle, thereby eventually preventing the light from being collected at a desired location, and also causes, as a diffractive optical system, a diffraction phenomenon between materials having refractive indices different from the design value, thereby preventing a desired diffraction order from being provided. In both cases, a phenomenon not intended in the design occurs, thereby reducing the diffraction efficiency and the image quality. Thus, it is preferable that the proportion of the area of the high refractive index layer 5 overlapping the inclined surface 2a be as low as practically possible from the viewpoint of optical performance.

A diffractive optical element having a relief pattern is generally configured such that the grating pitch gradually decreases in a direction away from the optical axis toward the outer circumference to provide a lens action (light converging diverging action). If there are elements that invalidate the inclined surface 2a arranged at regular intervals, the effect of such elements is inversely proportional to the length of the inclined surface 2a. Specifically, an inclined surface 2a having a greater length (i.e., a larger grating pitch) is less affected, while, on the contrary, an inclined surface 2a having a smaller length (i.e., a smaller grating pitch) is more affected.

In a diffractive optical element having a typical relief pattern, the high refractive index layer 5 described above has a smaller effect of reducing image quality on such diffractive optical element at a location closer to the optical axis, and, on the contrary, has a larger effect of reducing image quality on the diffractive optical element at a location closer to the outer circumference. Accordingly, the length of the portion of the high refractive index layer 5 overlapping the inclined surface 2a is ideally changed in proportion to the grating pitch. Specifically, the interval between adjacent high refractive index layers 5 formed on the inclined surface 2a is ideally reduced in the direction away from the optical axis toward the outer circumference.

However, although specific details may vary depending on the method of forming the high refractive index layer 5 on the wall surface 2b, a generally conceived method is likely to produce a generally constant interval between adjacent high refractive index layers 5 formed on the inclined surface 2a. In such case, the length L2 and the length L3 illustrated in FIG. 1B are respectively preferably 0.1 μm or more and preferably 0.2 μm or more.

The sum of the lengths L2 and the lengths L3 preferably account for 5% or less of the sum of the lengths L1 of the inclined surfaces 2a in the entire diffractive optical element. This proportion means that the reduction in the effect of the inclined surface 2a by the high refractive index layer 5 is maintained at 5% or less, or that a diffraction efficiency of 95% or higher with respect to the design value is secured. The above proportion exceeding 5% results in a reduced diffraction efficiency, and hence a reduced effect of chromatic aberration correction as compared to that generally expected for a diffraction grating. Such condition results in a generally-blurred captured image, and also reduces the flare reduction effect.

On the other hand, to reduce or eliminate separation at the interface between the first resin layer 2 or the second resin layer 3 and the high refractive index layer 5, it is preferable that the lengths L2 and L3 of the portions of the high refractive index layer 5 overlapping the inclined surface 2a be long. Such separation is caused by, for example, expansion and/or shrinkage of the first resin layer 2 and the second resin layer 3 due to a change in environmental condition such as temperature and/or humidity, or deformation of the first resin layer 2 due to cure shrinkage of the resin during the formation of the second resin layer 3. Thus, to reduce or eliminate the separation, reduction in the degree of expansion and shrinkage of the first resin layer 2 and the second resin layer 3 is important. According to the present disclosure, covering, by the high refractive index layer 5, the grating ridge 2c and the grating trough 2d of the first resin layer 2 reduces such expansion and/or shrinkage. As a result, separation at the interfaces between the first and second resin layers 2 and 3 and the high refractive index layer 5 can be reduced or eliminated.

Figure 2:
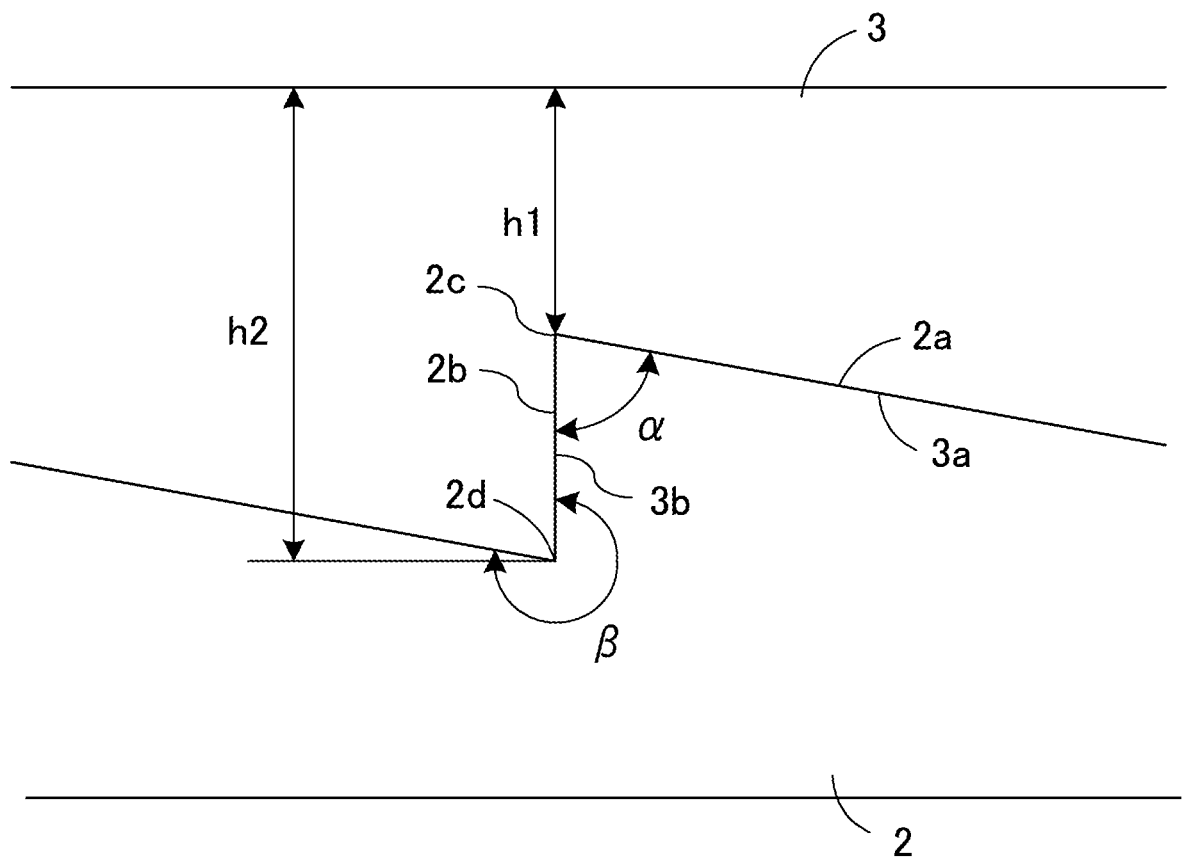
FIG. 2 is an enlarged view of a portion including a wall surface of the diffractive optical element of FIGS. 1A to 1C.

FIG. 2 is an enlarged view of a portion including the wall surfaces 2b and 3b of FIG. 1B. The angle α illustrated in FIG. 2 is an angle formed at the grating ridge 2c of the first resin layer 2 in the cross-section along the thickness direction. The angle β illustrated in FIG. 2 is an angle formed at the grating trough 2d of the first resin layer 2. The height h1 is the distance from the grating ridge 2c of the first resin layer 2 to the second base material 4 (i.e., the thickness of the second resin layer 3 at the grating ridge 2c). The height h2 is the distance from the grating trough 2d of the first resin layer 2 to the second base material 4 (i.e., the thickness of the second resin layer 3 at the grating trough 2d). Note that the high refractive index layer 5 is not shown in FIG. 2 for simplicity.

As described in the embodiment, a diffraction grating that includes inclined surfaces 2a for focusing the incident light onto a desired location by means of a relief pattern, and wall surfaces 2b that do not have a function as an optical element typically has the angles α and β in ranges of (0<) α≤120° and (210<) β≤270°. In a diffraction grating having such configuration, shrinkage in a wide angle at the grating trough 2d concentrates on one point, and thus tends to generate a stress higher than the stress at the grating ridge 2c. The relationship of h1<h2 further causes a higher degree of cure shrinkage of the resin material at the grating trough 2d than at the grating ridge 2c during formation of the second resin layer 3. In other words, the grating trough 2d tends to undergo a higher stress than the grating ridge 2c, and accordingly, separation is more likely to occur at the interface between the first resin layer 2 and the high refractive index layer 5. Thus, the high refractive index layer formed continuously to partly overlap the adjacent inclined surface 2a preferably has a greater length at the grating trough 2d than at the grating ridge 2c. Specifically, it has been found that the lengths L2 and L3 respectively satisfying L2≥0.1 μm and L3≥0.2 μm can effectively reduce or eliminate an interlayer separation.

Although specific details may vary depending on the materials that form the first and second resin layers 2 and 3, important aspects of the material of the high refractive index layer 5 are to have a refractive index higher than, and a linear expansion coefficient lower than, those of these resin materials. Although specific details may vary depending on the refractive index of the high refractive index layer 5, the high refractive index layer 5 is a thin film having a film thickness of several hundreds of nanometers at the maximum, and an erroneous difference from the design in the shape is as low as several tens of nanometers. In addition, although specific details may vary depending on the design, considering the tolerance of the refractive index of material of about 0.05 or less, a vacuum film formation technique is likely to be used to form the high refractive index layer 5. However, formation of a film on a curved surface such as that of a lens may generate a significant variation in the refractive index depending on the angle of incidence, thereby possibly preventing the desired effect from being provided. The dependence of the refractive index on the film formation angle is partly specific to the material, but also depends on the intended refractive index. A portion of a film formed by normal incidence will have a density and a refractive index as expected for that material, but with a decrease in the angle of incidence, the density decreases, and the refractive index also decreases accordingly. Since a material formed to have a higher refractive index in a portion under normal incidence undergoes a more significant change in the refractive index with a decrease in the angle of incidence, the refractive index of the portion under normal incidence is desirably not high in view of stable production. To provide a function as a waveguide at a location between diffraction gratings formed of resin, and provide production stability also, an inorganic material having a refractive index in a range from about 1.6 to about 2.1 under normal incidence is suitably used. Examples of such inorganic material include glass material components such as $Al_2O_3$, $HfO_2$, $ZrO_2$, and $La_2O_3$, and mixtures thereof.

A method for manufacturing the diffractive optical element illustrated by way of example in FIG. 1 will be described below using an example with reference to FIGS. 3A to 5B. It should be understood that the method for manufacturing the diffractive optical element according to the embodiment of the present disclosure is not limited to the manufacturing method described below as long as satisfactory performance can be provided.

Figure 3A:
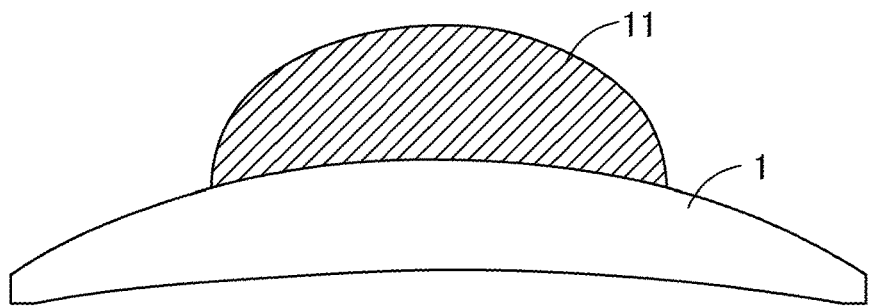
FIGS. 3A to 3C are process diagrams illustrating a method for manufacturing the diffractive optical element of FIGS. 1A to 1C.
Figure 3B:
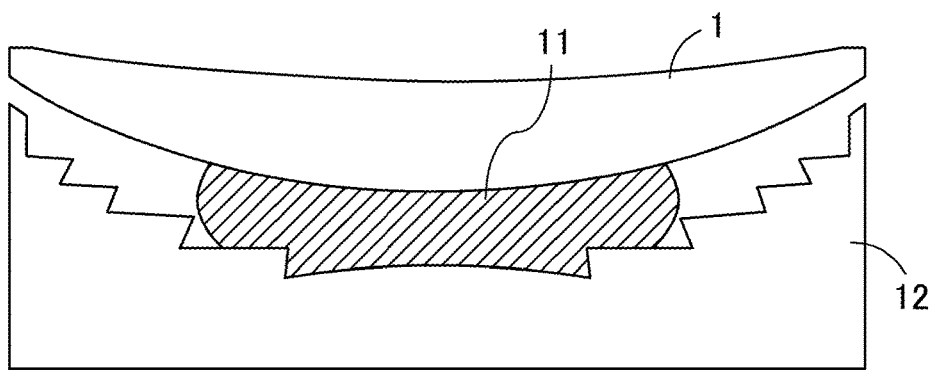
Figure 3C:
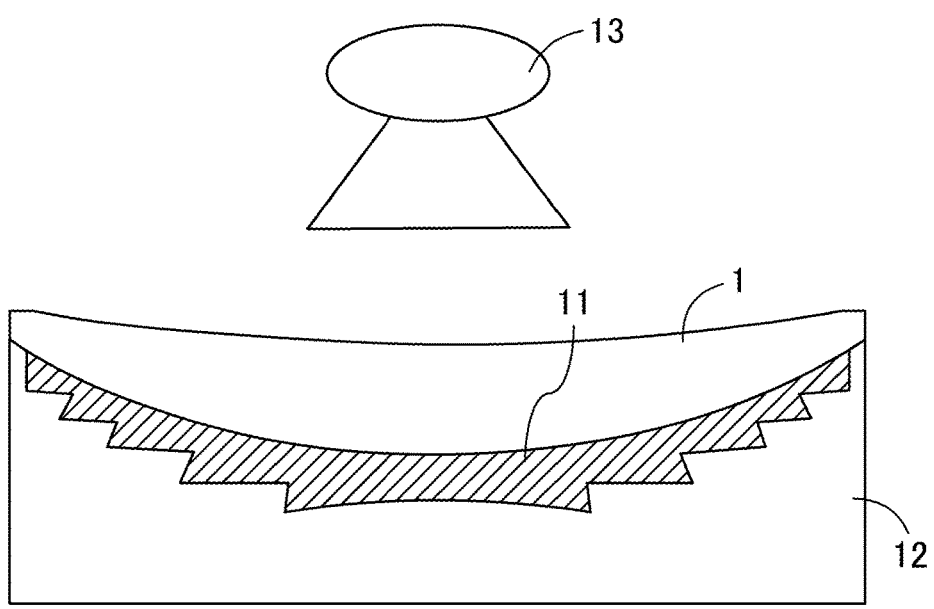
Figure 4A:
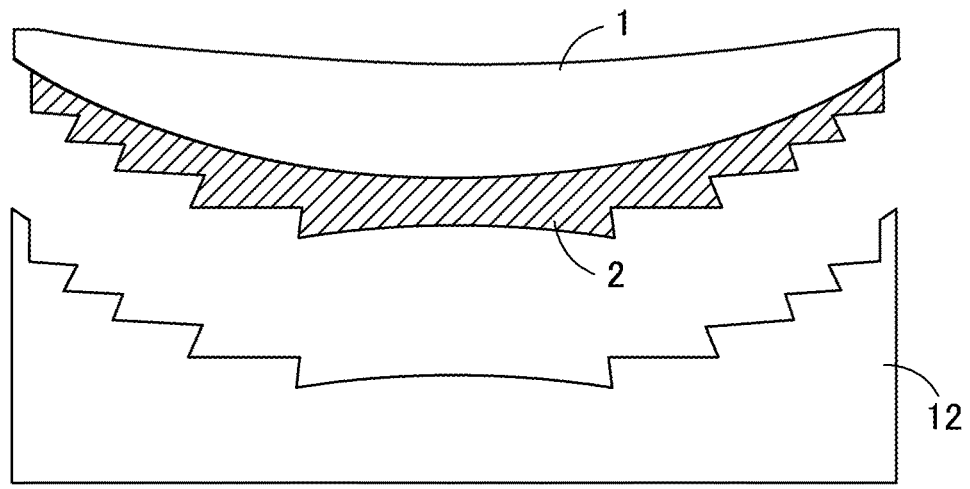
FIGS. 4A to 4C are process diagrams illustrating the method for manufacturing the diffractive optical element of FIGS. 1A to 1C.

The first resin layer 2 is formed on the first base material 1 using a replica technique. Specifically, a first resin material 11 is dropped on the base material 1 as illustrated in FIG. 3A. Then, this base material 1 is placed over a mold 12 having a desired shape to allow the resin material 11 to fill the gap between the base material 1 and the mold 12 as illustrated in FIG. 3B. Next, the first resin material 11 is cured using an ultraviolet (UV) radiation from a UV light source 13 through the base material 1 as illustrated in FIG. 3C to form the first resin layer 2 having the desired shape on the base material 1. The first resin layer 2 integrated with the base material 1 is released from the mold 12 as illustrated in FIG. 4A, and is then heated in an oven to allow the resin to completely cure.

Figure 4B:
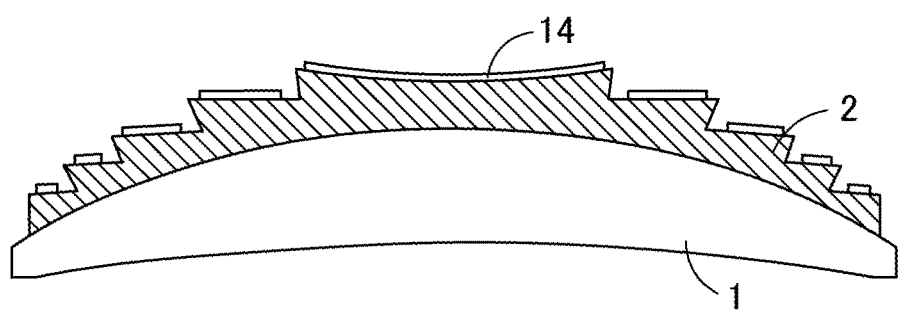
Figure 4C:
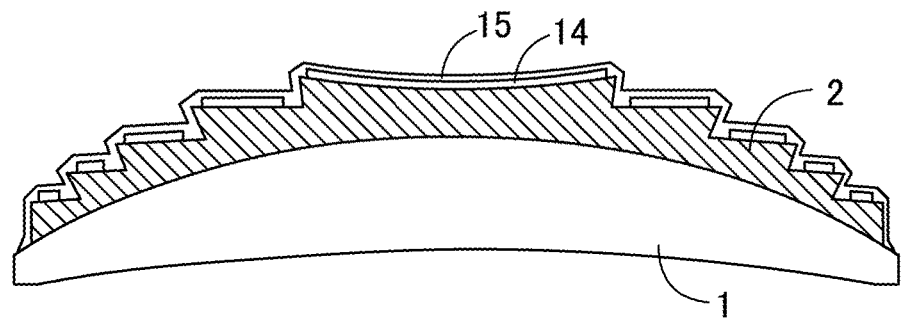
Figure 5A:
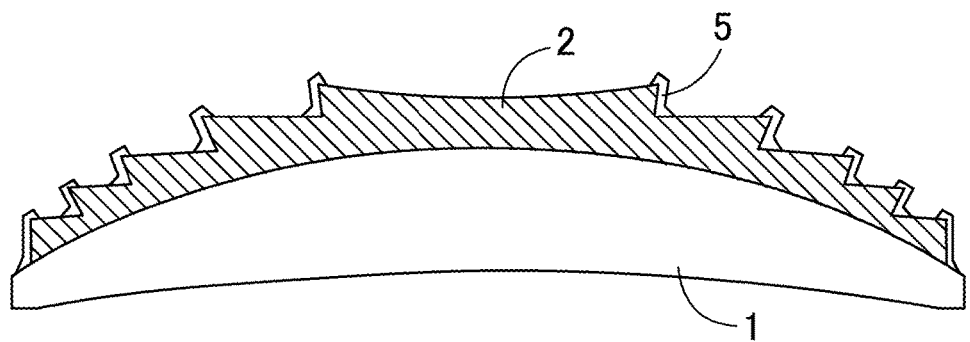
FIGS. 5A and 5B are process diagrams illustrating the method for manufacturing the diffractive optical element of FIGS. 1A to 1C.

Next, the high refractive index layer 5 is formed on the wall surface 2b of the first resin layer 2 as follows. A negative photoresist for a lift-off process is applied on the entire external surface of the first resin layer 2. A UV radiation is then irradiated in the direction parallel to the wall surface 2b (i.e., along the optical axis of the lens), after which the photoresist is developed in sodium carbonate solution. Due to a relatively large film thickness on the wall surface 2b in the direction parallel to the wall surface 2b, the exposure level is inadequate in the portion along the wall surface 2b. The exposure level is also inadequate in the portion at the grating trough 2d due to the influence of the wall surface 2b. Thus, the photoresist is developed in both of these portions. Despite an adequate exposure level at the grating ridge 2c, a high replacement efficiency with respect to the developing solution due to the shape results in a higher etching rate than in other locations. Thus, by optimization of the amount of irradiation of UV radiation and the duration of the developing, the film-remaining ratio of a photoresist 14 is adjusted to allow the photoresist to be developed and removed along the wall surface 2b, at the grating ridge 2c, and at the grating trough 2d as illustrated in FIG. 4B. The resultant product including the first resin layer 2 patterned is placed in a vapor deposition apparatus to deposit a high refractive index layer material 15 in the direction normal to the wall surface 2b as illustrated in FIG. 4C. Then, the photoresist 14 is removed in a strong alkaline solution. Thus, the high refractive index layer 5 is obtained that is formed continuously to extend beyond the wall surface 2b, and to partly overlap the adjacent inclined surfaces 2a of the first resin layer 2 as illustrated in FIG. 5A.

Figure 5B:
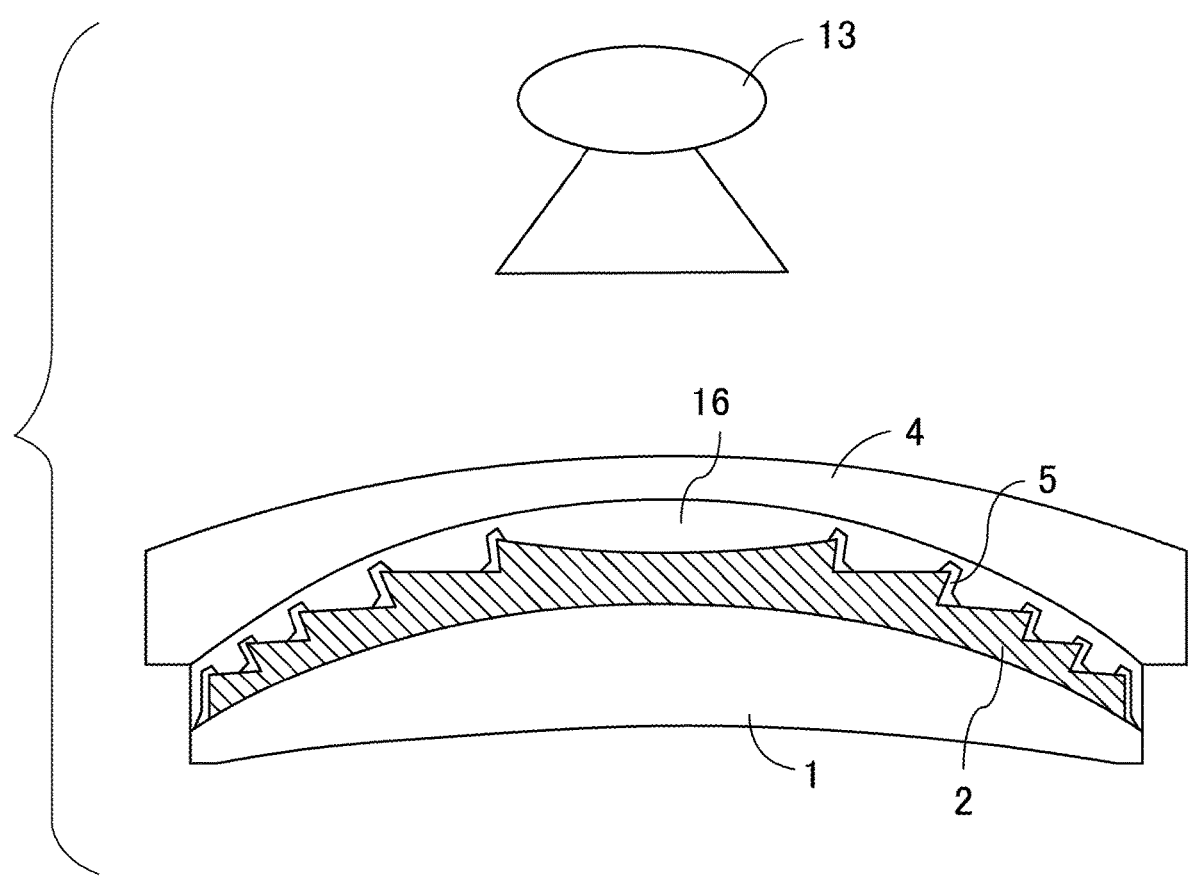

Finally, a second resin material 16 is filled into the gap between the first resin layer 2 and the second base material 4 described above, and a UV radiation is irradiated through the second base material 4 from the UV light source 13 as illustrated in FIG. 5B to cure the resin material 16 to obtain the second resin layer 3. Thus, the gapless dual-layered diffractive optical element is obtained.

The diffractive optical element according to the present disclosure is applicable to various optical apparatuses. Examples thereof include a still camera for capturing a still image, a video camera for capturing a moving image, a microscope, and an endoscope.

Figure 6:
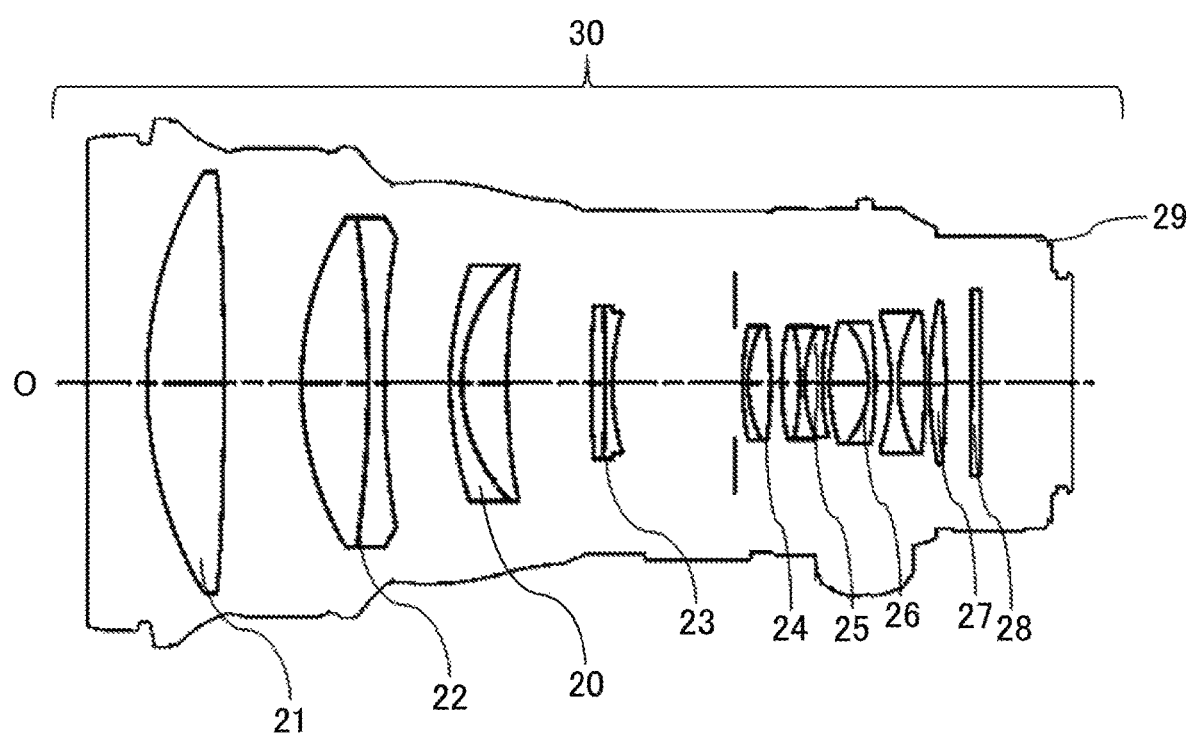
FIG. 6 is a schematic view illustrating an optical apparatus according to one embodiment of the present disclosure.

FIG. 6 is a cross-sectional view of an optical system in a lens barrel of an interchangeable lens used in a single lens reflex camera. This single lens reflex camera is one example of an optical apparatus according to one preferred embodiment of the present disclosure. The single lens reflex camera includes a lens barrel 30. The lens barrel 30 includes a casing 29 and an optical system disposed in the casing 29. The optical system includes lenses 21 to 28 and a diffractive optical element 20 arranged normal to an optical axis O. In FIG. 6, light enters from the lens 21 side, and the lens mount for attachment to, and detachment from, the camera body is disposed on the lens 28 side. Disposing the diffractive optical element 20 according to the present disclosure at an appropriate position in the optical system enables a small and lightweight lens barrel having reduced chromatic aberration to be provided. In addition, disposing the diffractive optical element 20 behind the lens 21 as illustrated in FIG. 6 prevents external light from directly entering the diffractive optical element 20, thereby allowing occurrence of flare to be reduced or eliminated.

EXAMPLES

Example 1 and Comparative Example 1

The gapless dual-layered diffractive optical element illustrated by way of example in FIG. 1 was produced using the process illustrated in FIGS. 3A to 5B. The first base material 1 having a convex shape and the second base material 4 having a concave shape were each a lens of an optical glass containing boron and silicon ("S-BSL7" manufactured by Ohara. Inc.). The first and the second base materials 1 and 4 respectively had a diameter of 58 mm and a diameter of 61 mm.

The diffractive optical element included the first resin layer 2 and the second resin layer 3 in order from the first base material 1, between the first base material 1 and the second base material 4. The first resin layer 2 was formed from a UV-curable resin formed by dispersing fine particles of indium oxide tin in a UV-curable acrylic resin mainly containing urethane-modified polyester acrylate having an unsaturated functional group, and dicyclopentenyloxyethyl methacrylate. The second resin layer 3 was formed from a material formed by dispersing fine particles of zirconia oxide in a UV-curable acrylic resin mainly containing urethane-modified polyester acrylate having an unsaturated functional group, and dicyclopentenyloxyethyl methacrylate. The refractive indices at d-line of the first resin layer 2 and of the second resin layer 3 were respectively 1.57 and 1.62. The first resin layer 2 had a grating height of 10 µm, and had spacings between adjacent gratings gradually decreasing from 3.0 mm to 0.1 mm in a direction away from the optical axis toward the outer circumference. The total number of the wall surfaces 2b was 80.

The high refractive index layer 5 of Example 1 was formed of an oxide mixture of $Al_2O_3$ and $ZrO_2$, and had a refractive index at d-line of 1.70 and a thickness of 170 nm. The lengths of the portions of the high refractive index layer 5 overlapping the inclined surface 2a were respectively L2=0.25 µm on the surface adjacent to the grating ridge 2c of the first resin layer 2, and L3=0.35 µm on the surface adjacent to the grating trough 2d. The sum of the lengths L2 and the lengths L3 in this configuration accounted for 0.28% of the sum of the lengths L1 of the inclined surfaces 2a.

The diffractive optical element of Example 1 was incorporated into an imaging optical system (EF lens barrel manufactured by Canon Inc.) that has been modified for determining the degree of flare, and the degree of flare caused by the wall surface was determined. The determination of the degree of flare caused by the wall surface was performed as follows. Only the grating part of the tenth annular zone from the optical axis was irradiated with laser beams of red (635 nm), green (532 nm), and blue (473 nm). The diffracted light generated was captured by a charge coupled device (CCD) sensor, and the ratio of unwanted diffracted light intensity to the incident light intensity was calculated as the degree of flare. The laser beams were generated using a laser "JUNO-Compact" manufactured by Showa Optronics Co., Ltd. Since the diffractive optical element of Example 1 was designed to use positive first (+1st) diffracted light, diffracted light of the other orders was the unwanted light that was not considered in the design. Thus, the intensity of unwanted diffracted light that was present at locations corresponding 0th, +2nd, negative first (−1st), and +3rd light, which would be imaged in effective pixels, was determined. Specifically, a slit that allows only 0th, +2nd, −1st, and +3rd light to pass through is placed in front of the CCD sensor to allow only the desired diffracted light to enter the CCD sensor. To ensure the accuracy of determination, the measurement was performed at a temperature of 23±0.5° C. and a relative humidity of 50±10%. In addition, to eliminate the effect of external light, the experimental setup was light-shielded using a light-shielding film. The determination result indicated that the degree of flare caused by the wall surface of the diffractive optical element of Example 1 was 0.002%.

The diffraction efficiency of the diffractive optical element was also determined. Specifically, light is emitted, along the optical axis, to a region having a grating spacing of 100 µm in the diffractive optical element, and a slit is placed on the diffracted light output side to allow only the diffracted light of the intended order to pass through the slit. The intensity of the diffracted light was determined by a spectrophotometer, and the ratio of the intensity of the diffracted light to the intensity of the incident light was calculated as the diffraction efficiency. The spectrophotometer used was spectrophotometer "U-4000" manufactured by Hitachi High-Technologies Corporation. The measurement result indicated that the diffraction efficiency in Example 1 was 98.7% or higher.

As Comparative Example 1, a diffractive optical element identical to that of Example 1 was prepared except that the high refractive index layer 5 was not formed on the wall surface. The determination results of the degree of flare and of the diffraction efficiency indicated that the degree of flare caused by the wall surface was 0.018%, and the diffraction efficiency was 99.0% or higher.

Thus, in Example 1, formation of the high refractive index layer 5 enabled the degree of flare caused by the wall surface to be reduced to ⅕ while the decrease in the diffraction efficiency was maintained at a low level.

A thermal shock test (30 cycles, each cycle having a 20-minute period at −40° C. and a 20-minute period at 40° C.) was performed on the diffractive optical element of Example 1 as a durability test, and the degree of flare and the diffraction efficiency were determined in a similar manner to that described above. The results indicated that the degree of flare caused by the wall surface was 0.002%, and the diffraction efficiency was 98.8% or higher. Thus, no change was observed in these optical characteristics between before and after the durability test. No particular change was either observed in the external appearance.

The geometry of the diffractive optical element was determined in the course of formation thereof using an interferometer (three-dimensional optical profiler "New-View" manufactured by Zygo Corporation). The geometry of the high refractive index layer 5 was determined by cutting the diffractive optical element after completion of the durability test, and observing the cross section using a scanning electron microscope (SEM).

Example 2 and Comparative Example 2

The first resin layer 2 and the second resin layer 3 were formed, and a gapless dual-layered diffractive optical element was produced, similarly to Example 1 except that the first and the second base materials 1 and 4 respectively had a diameter of 34 mm and a diameter of 38 mm. The refractive indices at d-line of the first resin layer 2 and of the second resin layer 3 were respectively 1.57 and 1.62. The first resin layer 2 had a grating height of 10 μm, and had spacings between adjacent gratings gradually decreasing from 3.9 mm to 0.2 mm in a direction away from the optical axis toward the outer circumference. The total number of the wall surfaces 2b was 65.

The high refractive index layer 5 of Example 2 was formed of an oxide mixture of $Al_2O_3$ and $La_2O_3$, and had a refractive index at d-line of 1.68 and a thickness of 140 nm. The lengths of the portions of the high refractive index layer 5 overlapping the inclined surface 2a were respectively L2=6.5 μm on the surface adjacent to the grating ridge 2c of the first resin layer 2, and L3=9.0 μm on the surface adjacent to the grating trough 2d. The sum of the lengths L2 and L3 in this configuration accounted for 4.97% of the sum of the lengths L1 of the inclined surfaces 2a.

Similarly to Example 1, the diffractive optical element of Example 2 was incorporated into an imaging optical system, and the degree of flare caused by the wall surface and the diffraction efficiency were determined. The determination results indicated that the diffractive optical element of Example 2 exhibited the degree of flare caused by the wall surface of 0.003%, and the diffraction efficiency of 95.0% or higher.

As Comparative Example 2, a diffractive optical element identical to that described above was prepared except that the high refractive index layer 5 was not formed on the wall surface 2b. The determination of the degree of flare and the diffraction efficiency similar to that described above indicated that the degree of flare caused by the wall surface was 0.030%, and the diffraction efficiency was 99.0% or higher.

Thus, the diffractive optical element of Example 2 reduced the degree of flare caused by the wall surface to ⅒ by the formation of the high refractive index layer 5 while the decrease in the diffraction efficiency was maintained within 5 percentage points.

A thermal shock test similar to that of Example 1 was performed on the diffractive optical element of Example 2, and the degree of flare and the diffraction efficiency were determined in a similar manner to that described above. The results indicated that the degree of flare caused by the wall surface was 0.003%, and the diffraction efficiency was 95.0% or higher. Thus, no change was observed in these optical characteristics between before and after the durability test. No particular change was either observed in the external appearance.

Example 3

A gapless dual-layered diffractive optical element was produced similarly to Example 2 except that the lengths of the portions of the high refractive index layer 5 overlapping the inclined surface 2a were respectively L2=10 μm and L3=15 μm. In the diffractive optical element of Example 3, the sum of the lengths L2 and L3 accounted for 8.02% of the sum of the lengths L1 of the inclined surfaces 2a.

Similarly to Example 1, the diffractive optical element of Example 3 was incorporated into an imaging optical system, and the degree of flare caused by the wall surface and the diffraction efficiency were determined. The determination results indicated that the diffractive optical element of Example 3 exhibited the degree of flare caused by the wall surface of 0.003%, and the diffraction efficiency of 91.8% or higher.

As compared to Comparative Example 2 (degree of flares 0.030%, diffraction efficiency: 99.0%), the diffractive optical element of Example 3 reduced the degree of flare caused by the wall surface to ⅒ by the formation of the high refractive index layer 5. However, the diffraction efficiency was decreased by about 8 percentage points partially due to film formation on a portion of the inclined surface. Note that, as compared to a lens without a diffractive optical element, the chromatic aberration was improved, and it was thus confirmed that the diffractive optical element exhibited sufficient performance as a diffractive optical element.

A thermal shock test similar to that of Example 1 was performed on the diffractive optical element of Example 3, and the degree of flare and the diffraction efficiency were determined in a similar manner to that described above. The results indicated that the degree of flare caused by the wall surface was 0.003%, and the diffraction efficiency was 91.8% or higher. Thus, no change was observed in these optical characteristics between before and after the durability test. No particular change was either observed in the external appearance.

Comparative Example 3

A gapless dual-layered diffractive optical element was produced similarly to Example 1 except that the high refractive index layer 5 was formed only an the wall surface, and thus not to overlap the inclined surfaces (i.e., L2=L3=0).

Similarly to Example 1, the diffractive optical element of Comparative Example 3 was incorporated into an imaging optical system, and the degree of flare caused by the wall surface and the diffraction efficiency were determined. The determination results indicated that the diffractive optical element of Comparative Example 3 exhibited the degree of flare caused by the wall surface of 0.002% and the diffraction efficiency of 99.0% or higher.

As compared to Comparative Example 1 (degree of flare: 0.018%, diffraction efficiency: 99.0%), the diffractive optical element of Comparative Example 3 reduced the degree of flare caused by the wall surface to ⅕ by the formation of the high refractive index layer 5 while the decrease in the diffraction efficiency was maintained at a low level.

A thermal shock test similar to that of Example 1 was performed on the diffractive optical element of Comparative Example 3, and the degree of flare and the diffraction efficiency were determined in a similar manner to that described above. The results indicated that the diffraction efficiency was 98.9% or higher, indicating that no change was observed between before and after the durability test. In contrast, the degree of flare caused by the wall surface was 0.010%, indicating that the flare reduction effect was reduced to ½. In addition, the diffractive optical element was irradiated with light emitted from a light emitting diode (LED) light source for external appearance investigation to investigate the external appearance. This investigation showed that a bright line appeared along an annular zone of the grating, which had not been observed before the durability test.

The diffractive optical element whose optical performance and external appearance had been changed by the durability test was cut to observe the cross section using an SEM. As a result, a separation was observed at a wall surface between toe first resin layer 2 or the second resin layer 3 and the high refractive index layer 5. Table 1 below summarizes the results of Examples 1 to 3 and of Comparative Examples 1 to 3.

TABLE 1

| | | Example 1 | Comparative Example 1 | Example 2 | Comparative Example 2 | Example 3 | Comparative Example 3 |
|---|---|---|---|---|---|---|---|
| High Refractive Index Layer | L2 (μm) | 0.3 | — | 6.5 | — | 10.0 | 0.0 |
| | L3 (μm) | 0.4 | — | 9.0 | — | 15.0 | 0.0 |
| | Proportion of Sum of L2 and L3 to Sum of L1 (%) | 0.28 | — | 4.97 | — | 8.02 | — |
| Flare Ratio | Before Durability Test (%) | 0.002 | 0.018 | 0.003 | 0.030 | 0.003 | 0.002 |
| | After Durability Test (%) | 0.002 | — | 0.003 | — | 0.003 | 0.010 |
| Diffraction Efficiency | Before Durability Test (%) | 98.7 | 99.0 | 95.0 | 99.0 | 91.8 | 99.0 |
| | After Durability Test (%) | 98.8 | — | 95.0 | — | 91.8 | 98.9 |
| External Appearance After Durability Test | | No Change | — | No Change | — | No Change | Separation Occurred |

The present disclosure can reduce the degree of flare caused by a wall surface by means of waveguide effect by formation of a high refractive index layer on the wall surfaces. The present disclosure can also reduce or eliminate separation at interfaces between the high refractive index layer and the first resin layer and the second resin layer since the high refractive index layer is formed to extend beyond the boundary between the inclined surface and the wall surface, and to partly overlap the inclined surface. Thus, the present disclosure can provide a gapless dual-layered diffractive optical element capable of reducing occurrence of flare for a prolonged period of time after production, and thus an optical apparatus capable of providing high optical performance for a prolonged period of time by using such diffractive optical element.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-028820, filed Feb. 20, 2017, and 2018-010318, filed Jan. 25, 2018, which are hereby incorporated by reference herein in their entirety.

What is claimed is:
1. A diffractive optical element comprising:
a first base material;
a first resin layer having a first surface and a second surface facing the first surface, the first surface having a plurality of first steps, wherein the plurality of first steps include a plurality of first flat wall surfaces and a plurality of first inclined surfaces each bounded by the first flat wall surfaces, and the second surface is in contact with the first base material;
a second resin layer being in direct contact with the plurality of first inclined surfaces of the first surface of the first resin layer, wherein a surface of the second resin layer, on a side closer to the first resin layer, has a plurality of second steps respectively corresponding to the plurality of first steps of the first resin layer; and
a high refractive index portion being in contact with the first flat wall surfaces of the first resin layer and wall surfaces of the second resin layer, wherein the high refractive index portion has a refractive index higher than refractive indices of the first resin layer and of the second resin layer,
wherein the plurality of first flat wall surfaces includes a first wall surface portion, the plurality of first inclined surfaces includes a first inclined surface portion disposed continuously with the first flat wall surface portion and a second inclined surface portion disposed continuously with the first flat wall surface portion on an opposite side of the first inclined surface portion, and wherein the high refractive index portion is continuously formed in contact with a part of the first inclined surface portion, the first flat wall surface portion, and a part of the second inclined surface portion.

2. The diffractive optical element according to claim 1, wherein, in a cross section taken along a straight line passing through a center of the diffractive optical element in a layer-stacking direction, the first inclined surface portion is disposed continuously with the first flat wall surface portion at a grating trough of the first flat wall surface portion, the second inclined surface portion is disposed continuously with the first flat wall surface portion at a grating ridge of the first flat wall surface portion, a first length that is a length of a part of the high refractive index portion in contact with the second inclined surface portion in a direction along the second inclined surface portion at the grating ridge of the first flat wall surface portion is 0.1 µm or less, and a second length calculated by subtracting a length of a part of the high refractive index portion not in contact with the first inclined surface portion or the second inclined surface portion in a direction along the first inclined surface portion at the grating trough of the first flat wall surface portion from a length of a part of the high refractive index portion in contact with the first inclined surface portion in the direction along the first inclined surface portion at the grating trough of the first flat wall surface portion is 0.2 µm or more.

3. The diffractive optical element according to claim 2, wherein the second length is greater than the first length.

4. The diffractive optical element according to claim 1, wherein in a planar view of the diffractive optical element, the first steps are each formed to have a concentric shape.

5. The diffractive optical element according to claim 1, further comprising:

a second base material being in contact with a surface opposite a surface of the second resin layer in contact with the first resin layer.

6. The diffractive optical element according to claim 1, wherein the high refractive index portion contains an inorganic material.

7. The diffractive optical element according to claim 6, wherein the inorganic material is one of $Al_2O_3$, $HfO_2$, $ZrO_2$, and $La_2O_3$, or a mixture of two or more thereof.

8. The diffractive optical element according to claim 1, wherein a linear expansion coefficient of the high refractive index portion is lower than linear expansion coefficients of the first resin layer and the second resin layer.

9. The diffractive optical element according to claim 1, wherein, in a cross section taken along a straight line passing through a center of the diffractive optical element in a layer-stacking direction, wherein the plurality of first flat wall surfaces includes a second wall surface portion, and the plurality of first inclined surfaces includes a third inclined surface portion, wherein the second inclined surface portion is disposed continuously with the second wall surface portion at a grating trough of the second wall surface portion, and the third inclined surface portion is disposed continuously with the second wall surface portion at a grating ridge of the second wall surface portion, and wherein when a length calculated by subtracting a length of a part of the high refractive index portion not in contact with the second inclined surface portion or the third inclined surface portion in a direction along the second inclined surface portion at the grating trough of the second wall surface portion from a length of a part of the high refractive index portion in contact with the second inclined surface portion in the direction along the second inclined surface portion at the grating trough of the second wall surface portion is a third length, a sum of the first length and the third length accounts for 5% or less of a length of the second inclined surface portion.

10. An optical apparatus, comprising:
a diffractive optical element comprising:
a first base material;
a first resin layer having a first surface and a second surface facing the first surface, the first surface having a plurality of first steps, wherein the plurality of first steps include a plurality of first flat wall surfaces and a plurality of first inclined surfaces each bounded by the first flat wall surfaces, and the second surface is in contact with the first base material;
a second resin layer being in direct contact with the plurality of first inclined surfaces of the first surface of the first resin layer, wherein a surface; of the second resin layer, on a side closer to the first resin layer, has a plurality of second steps respectively corresponding to plurality of the first steps of the first resin layer; and
a high refractive index portion being in contact with the first flat wall surfaces of the first resin layer and wall surfaces of the second resin layer, wherein the high refractive index portion has a refractive index higher than refractive indices of the first resin layer and of the second resin layer, wherein the plurality of first flat wall surfaces includes a first wall surface portion, the plurality of first inclined surfaces includes a first inclined surface portion disposed continuously with the first flat wall surface portion and a second inclined surface portion disposed continuously with the first flat wall surface portion on an opposite side of the first inclined surface portion, and wherein the high refractive index portion is continuously formed in contact with a part of the first inclined surface portion, the first flat wall surface portion, and a part of the second inclined surface portion, and wherein the diffractive optical element is a lens.

11. The optical apparatus according to claim 10, wherein the optical apparatus is a camera.

12. The optical apparatus according to claim 10, wherein the optical apparatus is an interchangeable lens.

13. The diffractive optical element according to claim 1, wherein the high refractive index portion is disposed in contact with all of the first wall surfaces.

14. The diffractive optical element according to claim 13, wherein, in a cross section taken along a straight line passing through a center of the diffractive optical element in a layer-stacking direction, a total length calculated by excluding the length of the part of the high refractive index portion not in contact with the plurality of the first inclined surfaces in the direction along the plurality of the inclined surfaces from the length of the part of the high refractive index portion in contact with the plurality of the inclined surfaces in the direction along the plurality of the inclined surfaces is 5% or less of a total length of the plurality of the inclined surfaces.

* * * * *